July 22, 1930.  G. POLCICH  1,771,190
PRIMARY CELL
Filed Nov. 4, 1926
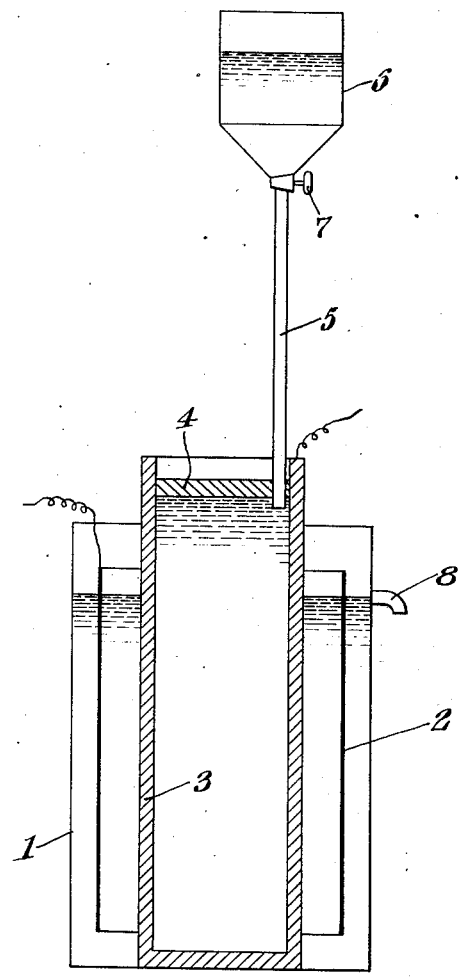
Inventor
Guenther Polcich
By his Attorneys
Dean Fairbank Albright & Hirsch Patented July 22, 1930

1,771,190

UNITED STATES PATENT OFFICE

GUENTHER POLCICH, OF VIENNA, AUSTRIA

PRIMARY CELL

Application filed November 4, 1926, Serial No. 146,103, and in Austria July 30, 1926.

In the efforts to create a primary cell which is practically useful, and which has a high capacity and great serviceability, light metals having a high solution pressure have been tried, so as to obtain for a given weight of the element the maximum potential and consequently the maximum voltage. Magnesium and its chemical-physical analogs, which have a very high solution pressure with low weight, promise the greatest success. However, their employment for primary cells has not been successful thus far on account of the especially high solution pressure, whereby the electrode is consumed too rapidly and is also corroded even when the cell is not working.

As one important feature of the present invention, I have discovered certain electrolytes which when used with magnesium produce a high potential, but which, on the other hand, do not easily dissolve magnesium and attack it as little as possible when the cell is at rest.

I have discovered that such solutions are suitable which dissociate to a high degree, and the components of which have no particular great affinity for the magnesium ions. In carrying out my invention I preferably employ as the electrolyte and the depolarizer two compounds which differ primarily as to the degree of oxygen content, so that by giving off oxygen the depolarizer will be converted into the electrolyte. Preferably the depolarizer is an alkali persulfate and the electrolyte an alkali sulfate. The surplus oxygen of the depolarizer unites with the hydrogen collecting on the electrode, so as to form water and a fresh supply of the electrolyte.

I have found further, that it is important to employ very pure magnesium (99.8%), or the same in alloys such as "magnalium" (80–98% magnesium, the remainder aluminum and copper) or "electron" (20% magnesium, mainly aluminum, and a little copper and zinc). Finally, the magnesium is amalgamated, in order to prevent corrosion on the magnesium electrode during the inoperative period of the cell, as much as possible. This is done according to my invention by depositing mercury on the magnesium electrolytically and then heating the electrode, formed in this way, to about 200° to 400° C. under exclusion of air.

A liquid depolarizer, applied in a special manner, is used to prevent the generation of a secondary current which would weaken the main current. Up to the present time, galvanic cells with liquid depolarizers have usually been equipped with a diaphragm of clay or gypsum, which prevents the depolarizer from mixing with the electrolyte. One of the disadvantages of this arrangement is that the diaphragm produces a great internal resistance in the electrolyte.

As one feature of the present invention, I avoid the necessity for a special diaphragm by making the non-corroding electrode proper of porous material and giving it the shape of a hollow body which is employed as a receptacle for the liquid depolarizer. The effectiveness of the depolarizer is greatly improved in this manner, because the hydrostatic pressure acts from the inside toward the outside, whereby the hydrogen present in the pores of the electrode is driven out. The chemical action of the depolarizer which burns up the hydrogen is thus supplemented by the mechanical action whereby the hydrogen particles are forced from the surface of the electrode.

An increase of the mechanical effect can be obtained by putting under pressure the liquid depolarizer which is contained in the porous electrode. This is accomplished either by making the container which is formed by the non-corroding electrode taller than the container for the electrolyte, or by connecting it to a supply vessel located on a higher level. The latter arrangement is shown diagrammatically in the drawing, in which the single figure is a central vertical section through a cell embodying my invention.

The container 1, in the form illustrated, for the electrolyte, has the magnesium electrode 2 which may, for example, be cylindrical in shape. Within is the non-corroding electrode 3 which may consist, for example, of porous carbon and is in the form of a cylindrical container which is closed at the top by a cover 4. A tube 5 leads through the cover from a vessel 6, located at a higher level. The connection between the latter and the tube can be closed by a cock 7.

The container 3, of porous carbon, is filled with the liquid depolarizer and is subjected to the excess pressure of the liquid in the vessel 6. This excess pressure is relatively small, but is nevertheless sufficiently high to cause a continual passage of depolarizing liquid through the walls of the porous carbon electrode. The electrolyte in container 1 would thus continually mix with the depolarizing liquid, but this, in general, is undesirable.

This difficulty is overcome according to my invention by the use of a liquid as a depolarizer which by the liberation of oxygen is converted into the electrolyte. If, for example, the electrolyte consists of ammonium sulfate, the depolarizer used is ammonium persulfate, which is changed into ammonium sulfate by combustion of the hydrogen which has collected on the carbon electrode. The depolarizer thus causes a regeneration of the electrolyte and it is only necessary to prevent its undesirable accumulation by providing an overflow 8, or the like.

The ammonium persulphate in acting as a depolarizing liquid gives off oxygen within the pores of the carbon electrode, and is thereby converted into the electrolyte. The reaction which takes place in the conversion of the depolarizer into the electrolyte may be according to the following equation:

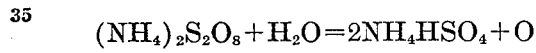

$$(NH_4)_2S_2O_8 + H_2O = 2NH_4HSO_4 + O$$

The oxygen which is set free by this reaction combines with the hydrogen generated on the carbon electrode to form water, and thereby cause depolarization. If the depolarizing liquid is continuously supplied, it will be obvious that the electrolyte is continuously renewed by the conversion of depolarizer into electrolyte.

To carry out this reaction it is important that the conversion of the depolarizing liquid into the electrolyte is effected within the pores of the wall of the hollow carbon electrode. The electrolyte and the depolarizer are effectively separated from one another, and it is impossible for the depolarizing liquid to get into the electrolyte as the decomposition of per-salts on porous carbon is a perfect and complete one.

If the element is not operating, the discharge of the depolarizing liquid may be stopped by closing the cock 7.

Having thus described my invention, what I claim as new and desire to secure by Letters Patent is:

1. A primary cell comprising a soluble electrode containing a light metal, a carbon electrode, an electrolyte consisting of a water solution of an alkali sulfate and a liquid depolarizing agent consisting of a water solution of an alkali persulfate.

2. A primary cell comprising a soluble electrode containing magnesium, a porous carbon electrode, an electrolyte consisting of a water solution of an alkali sulfate and a liquid depolarizing agent consisting of a water solution of an alkali persulfate.

3. A primary cell comprising a soluble electrode containing magnesium, a porous carbon electrode, an electrolyte consisting of a water solution of ammonium sulfate and a liquid depolarizing agent consisting of a water solution of ammonium persulfate.

4. A primary cell having an electrolyte container, a pair of electrodes therein, one including magnesium and the other in the form of a hollow porous carbon wall, a water solution of an alkali sulfate in said container on one side of said wall, and a liquid depolarizing agent consisting of a water solution of an alkali persulfate within said container on the other side of said wall.

5. A primary cell having an electrolyte container, a pair of electrodes therein, one including magnesium and the other in the form of a hollow porous carbon cylinder, a water solution of ammonium sulfate in said container on one side of the wall of said cylinder, and a liquid depolarizing agent consisting of a water solution of ammonium persulfate within said container and on the other side of said wall.

6. A primary cell having an electrolyte container, a pair of electrodes therein, one including magnesium and the other in the form of a porous carbon wall, a water solution of an alkali sulfate in said container on one side of said wall, and a liquid depolarizing agent consisting of a water solution of an alkali persulfate within said container, on the other side of said wall and under higher pressure than the solution of an alkali sulfate.

7. A primary cell having an electrolyte container, a pair of electrodes therein, one including magnesium and the other in the form of a hollow porous cylinder, a water solution of ammonium sulfate in said container but outside of said cylinder, and a liquid depolarizing agent consisting of a water solution of ammonium persulfate within said cylinder under higher pressure than the solution of ammonium sulfate.

Signed at Vienna, Austria, this 13th day of October A. D. 1926.

GUENTHER POLCICH.